United States Patent

[11] 3,593,749

| [72] | Inventor | Edwin E. Reardon<br>2613 Lake Shore Drive, Mandeville, La. 70448 |
|---|---|---|
| [21] | Appl. No. | 847,211 |
| [22] | Filed | Aug. 4, 1969 |
| [45] | Patented | July 20, 1971 |

[54] PIPELINE PIG STOPPER
11 Claims, 8 Drawing Figs.

[52] U.S. Cl. ................................................ 138/93, 138/97
[51] Int. Cl. ............................................... F16l 55/12
[50] Field of Search .................................. 138/90, 91, 93, 97

[56] References Cited
UNITED STATES PATENTS

| 1,893,979 | 1/1933 | Barrere | 138/93 X |
| 2,164,195 | 6/1939 | Waltermire | 138/93 X |
| 2,374,947 | 5/1945 | Nicholson | 138/90 |
| 2,974,685 | 3/1961 | Ver Nooy | 138/90 |

*Primary Examiner*—Laverne D. Geiger
*Assistant Examiner*—Richard J. Sher
*Attorneys*—Clarence A. O'Brien and Harvey B. Jacobson

ABSTRACT: A pipeline is internally engaged by mechanical grippers and expansible sealing rims on the cylindrical core of a plug or stopper from which an actuating shaft projects. Displacement of the actuating shaft relative to the stopper when axially fixed to the pipeline, vents the sealing rims and disengages the grippers against a spring bias to releasably hold them in a retracted position.

PATENTED JUL 20 1971

Edwin E. Reardon
INVENTOR

BY *Clarence A. O'Brien*
*and Harvey B. Jacobson*
Attorneys

PATENTED JUL 20 1971
3,593,749
SHEET 2 OF 2
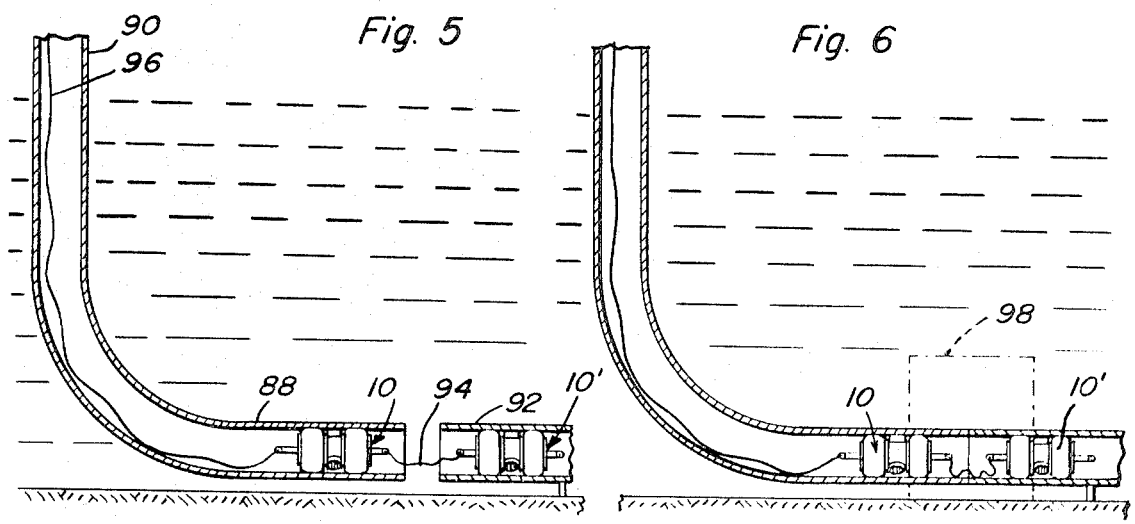
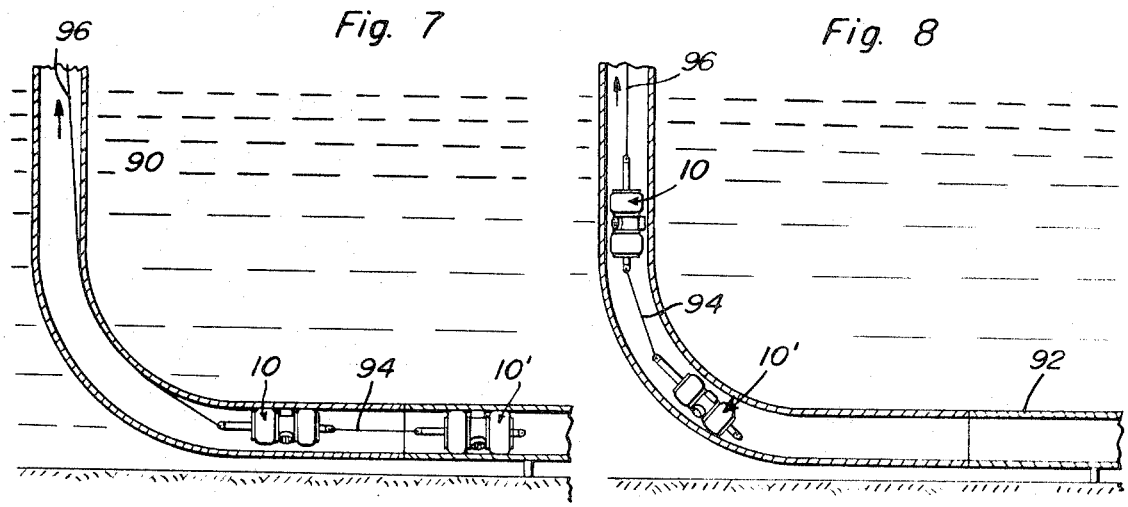
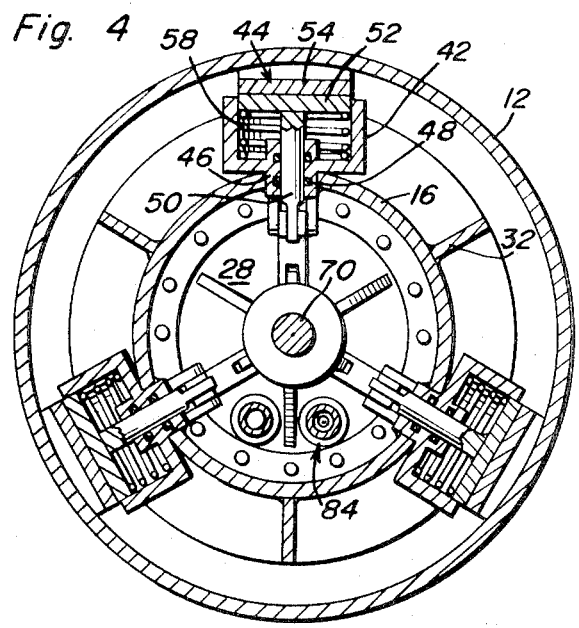
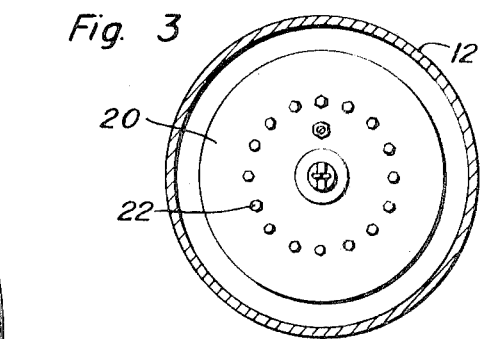
Edwin E. Reardon
INVENTOR
BY Clarence A. O'Brien
and Harvey B. Jacobson
Attorney

PIPELINE PIG STOPPER

This invention relates to releasable plug devices for tubular members and particularly to stopper devices that are useful in offshore pipeline construction, although not necessarily limited thereto.

While pipeline "pigs" or stopper devices are well known, they are limited in use and loading capacity. It is therefore an important object of the present invention to provide a pipeline stopper device capable of being utilized in conjunction with other stopper devices for plugging a pipeline at one or more spaced locations without danger of being jarred loose from such locations and yet capable of being released from a remote location. Thus, stopper devices made in accordance with the present invention are particularly useful in connection with underwater welding of pipe sections as one of the important purposes of the present invention.

In accordance with the present invention, the pipeline stopper device includes a hollow, cylindrical core enclosing a pressure sealed chamber pressurized by an external source of fluid under pressure through an inlet valve in order to inflate annular sealing rims or tubes which are anchored to the core by fittings through which fluid communication is established between the pressurized chamber and the interior of the sealing tubes. The sealing tubes are axially spaced on the core by a plurality of equally spaced gripper assemblies that are spring biased radially outwardly into engagement with the internal wall of the pipeline within which the stopper device is positioned. The gripper devices may be radially retracted by axial displacement of a cam member internally of the cylindrical core to an axial end position at which a detent groove holds the gripper devices in their retracted positions. An actuating shaft is connected to the cam member and extends axially from the cylindrical core through slide bearings which seal the pressurized chamber. Stop elements mounted on the actuating shaft limit displacement of the shaft and the cam member fixed thereto between two operative positions. In one operative position of the cam member, wherein a stop element engages one of the slide bearings, a vent passage formed in the actuating shaft vents the chamber and thereby deflates the annular sealing tubes so that the entire stopper device may be disengaged from the internal surfaces of the pipeline for retrieval purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a transverse sectional view on a smaller scale taken substantially through a plane indicated by section line 3-3 in FIG. 1.

FIG. 4 is a transverse sectional view taken substantially through a plane indicated by section line 4-4 in FIG. 1.

FIGS. 5 through 8 are simplified sectional views illustrating one way in which stopper devices made in accordance with the present invention may be utilized.

Figure 1:
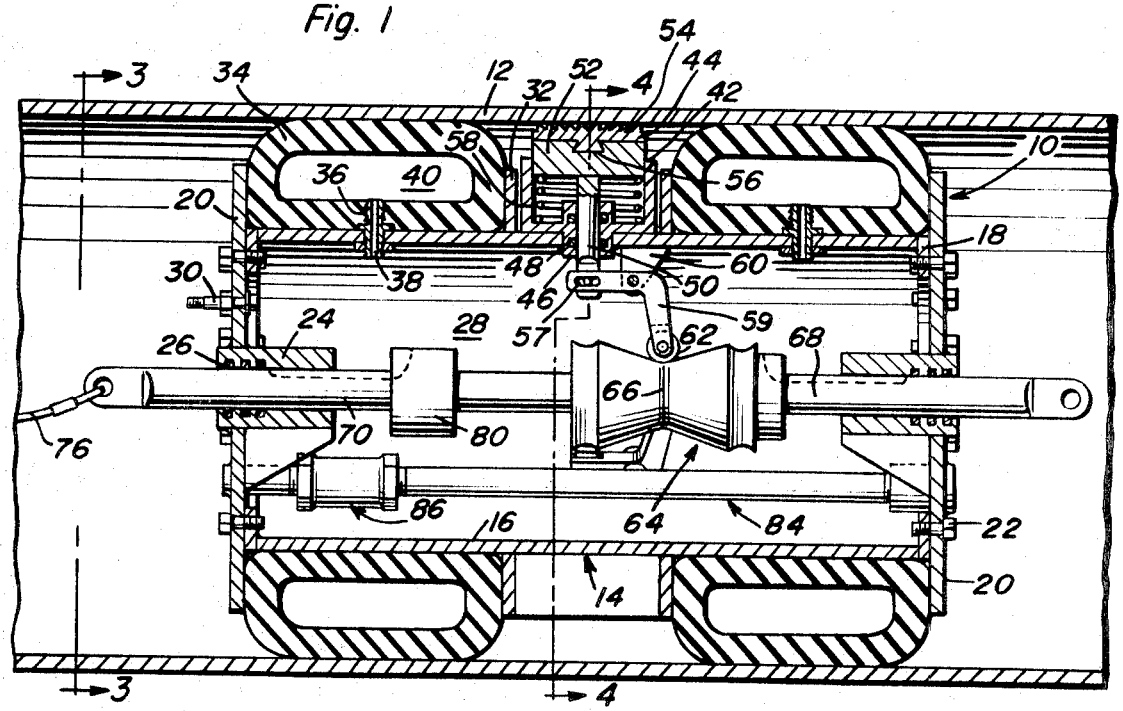
FIG. 1 is a longitudinal sectional view through a typical stopper constructed in accordance with the present invention in an engaged position within a pipeline.

Referring now to the drawings in detail and initially to FIGS. 1, 3 and 4, a stopper device generally referred to by reference numeral 10 is shown installed within a pipeline section 12 engaging the internal surfaces thereof. The stopper device includes as its main body, a rigid core 14. The core consists of a hollow cylindrical member 16 having annular end flanges 18 at the opposite axial ends to which end plates 20 are secured by a plurality of fasteners 22. Centrally secured to the end plates 20 as by welding, are slide bearing sleeves 24 formed with internal grooves seating wiping seals 26. Thus, the core 14 encloses a cylindrical, pressure sealed chamber 28. The chamber 28 is pressurized from an external source of pressurized fluid through an inlet valve 30 mounted on one of the end plates 20. For example, an elongated flexible conduit may be secured to the portion of the inlet valve 30 projecting externally of the core so that fluid under pressure will be admitted to the chamber 28 when the end of the flexible tube remote from the stopper device 10 is connected to a pressurized source of fluid.

The end plates 20 project radially beyond the cylindrical member 16 of the core and together with a pair of annular flanges 32 secured as by welding to the cylindrical member 16, form a pair of axially spaced seats for a pair of expansible sealing tubes or rims 34. The sealing tubes are anchored to the cylindrical member 16 by fittings 36 which are secured to the cylindrical member and are provided with passages 38 establishing fluid communication between the chamber 28 and the interior 40 within the sealing tubes 34. Thus, when the chamber 28 is pressurized as aforementioned, the annular sealing tubes 38 will be expanded radially outwardly into engagement with the internal surfaces of the pipeline section 12 as shown in FIG. 1 in order to form a seal between portions of the pipeline section on either axial side of the stopper device.

Located axially between the pair of sealing tubes 34 on the cylindrical member 16, are a plurality of retainers 42 associated with mechanical gripping devices 44. In the illustrated embodiment, there are three gripping devices 44 which are circumferentially spaced from each other by equal amounts. The retainer 42 of each gripping device includes a sleeve portion 46 that extends radially through the cylindrical member 16 and is provided with wiping seals 48 in order to maintain the chamber 28 pressure sealed. A shaft portion 50 slidably extends through the sleeve portion 46 into the chamber 28 and is connected at its radially outer end to a piston element 52 slidably mounted by the retainer 42. A gripper element 54 is removably mounted on the radially outer end of the piston element 52 by a tongue and groove arrangement 56. A spring 58 seated within the retainer 42, biases the piston and gripper element radially outwardly to an extended position for engagement with the internal surface of the pipeline section.

The radially inner end of the shaft portion 50 within the chamber 28, is connected by a pin and slot connection 57 to an operating link or lever arm 59 which is pivotally mounted by a pivot bracket 60 projecting radially inwardly from the internal surface of the cylindrical member 16. The radially inner end of the link arm 59 is provided with a follower roller 62 for engagement with an operating cam member generally referred to by reference numeral 64.

Figure 2:
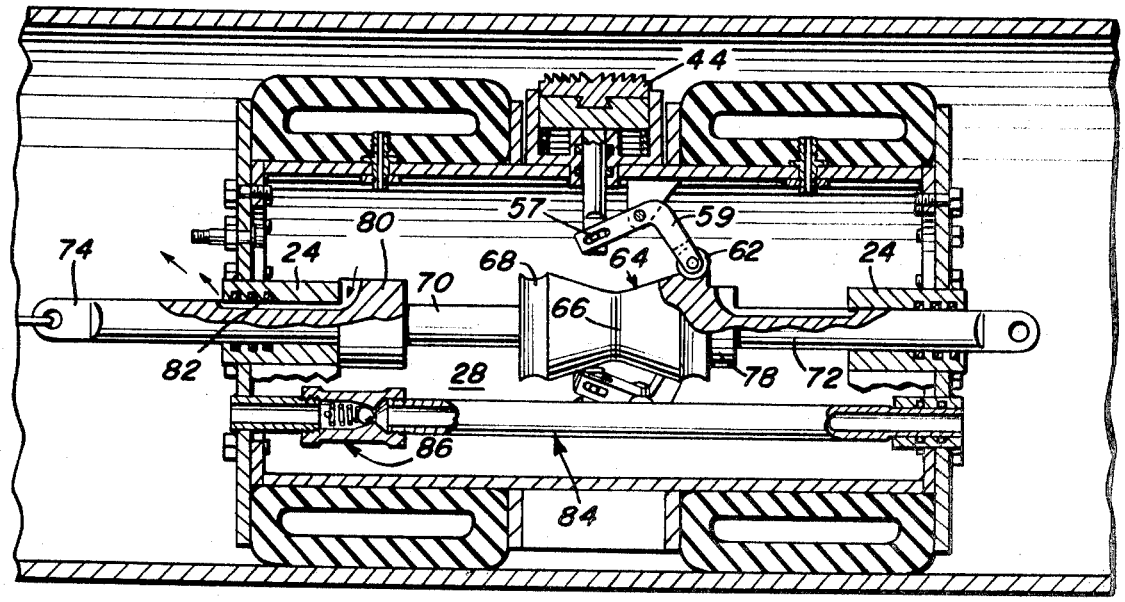
FIG. 2 is a longitudinal sectional view through the stopper shown in a disengaged condition.

The cam member is cylindrical in cross section so as to equally and simultaneously control each of the gripping devices 44 when the cam member is axially displaced along the longitudinal axis of the cylindrical core 14 between three operative positions. In the operative position shown in FIG. 1, the follower rollers 62 engage an intermediate, small diameter profile portion 66 of the cam member. In this position of the cam member, the springs 58 are permitted to bias the gripper elements to the radially extended positions limited by engagement of the follower rollers 62 with the cam member. When the cam member is axially displaced to either of the other two operative positions, one of which is illustrated in FIG. 2, the follower roller 62 rolls up the cam profile to pivotally displace the lever arm 59 and radially retract the gripper elements inwardly to a retracted position. Thus, axial displacement of the cam member retracts the gripper elements against the bias of the springs 58 and holds them in the retracted position when the follower rollers 62 become seated in the annular detent groove 68 formed at both axial ends of the cam member. It will therefore be apparent, that a predetermined axial displacing force is required to displace the cam member 64 from either of the end positions, one of which is illustrated in FIG. 2 before the force of the springs 58 take over to radially extend the gripping devices 44 to positions limited by the intermediate profile portion 66 of the cam member.

Displacement of the cam member between its operative positions is effected through actuating shaft sections 70 and 72 connected to the opposite axial ends of the cam member. The shaft sections slidably extend through the slide bearing sleeves 24 and are provided at their axially outer end portions with connecting formations 74 to which actuating cables 76 may be anchored. A stop formation 78 extends axially from one axial end of the cam member 64 while a stop element 80 is mounted on the shaft section 70 in axially spaced relation to the cam member 64 in order to limit axial displacement of the cam member relative to the core in both axial directions. The axial limit positions of the cam member are therefore determined by abutment between the stop formation 78 and stop element 80 with the slide bearing sleeves 24.

Each shaft section is provided with a vent passage 82 that extends a predetermined axial distance along the shaft section from the stop formation 78 or stop element 80. The axial length of each vent passage is such that when the associated stop formation or stop element abuts the slide bearing sleeve as shown in FIG. 2, the vent passage is effective to vent the pressure sealed chamber 28 and thereby cause deflation of the sealing tubes 34 at the same time that the mechanical gripping devices 44 are retracted.

As shown in FIGS. 1, 2 and 4, fluid communication may be established through the stopper device with other stopper devices from an external pressure source by means of a pair of pressure supply conduits 84. Each conduit 84 is provided with a one-way check valve 86 so as to conduct fluid under pressure in one direction only. The utility of the stopper device 10 is thereby extended.

Stopper devices as hereinbefore described are particularly useful in connection with underwater welding operations as well as other purposes. For example, stopper devices may be utilized to connect risers to underwater pipe sections in offshore pipeline construction, for repairing damaged underwater pipelines, and to connect new pipelines to existing pipes in underwater installations. The stopper device may also be useful in underwater lowering and raising of pipe sections in place of presently utilized methods of welding a cap to the upper end of a riser and securing a lowering cable thereto, requiring subsequent removal of the cap.

In connection with underwater welding operations, the use of two stopper devices is necessary in order to seal off adjacent portions of pipe sections to be welded to each other. Referring for example to the welding procedure illustrated in FIGS. 5 through 8, the utility of the present invention will become clear. One stopper device 10 as shown in FIG. 5, may be placed within the lower horizontal end portion 88 of a riser pipe 90 and internally pressurized after the gripping devices have been extended so as to lock the stopper device in position. When the stopper device is so installed within the riser, the riser is lowered into the water as shown in FIG. 5 and brought into adjacency to a pipe section 92 which had also been previously laid with a similar stopper device 10' installed therein in the same manner. Also, as shown in FIG. 5, the actuating shafts associated with the stoppers 10 and 10' are interconnected by a cable 94 while an actuating cable 96 extends from the actuating shaft of stopper 10 to the offshore platform through the riser pipe 90. When the riser pipe and pipe section 92 are brought together as shown in FIG. 6, the space within the abutting pipe sections between the stoppers 10 and 10' will be sealed so that a habitat or caisson 98 shown by dotted line in FIG. 6 may be evacuated between the abutting portions of the pipe sections and a welding operation performed therein. After the pipe sections are welded, tension applied to the actuating cable 96 as shown in FIG. 7, causes release of the stopper 10 as hereinbefore described. A continued pull on the actuating cable 96 to retrieve the stopper 10, then exerts tension on connecting cable 94 so as to cause release of the second stopper 10'. Both stoppers may then be retrieved as shown in FIG. 8.

It should of course be appreciated that one or more stopper devices may be utilized in different installations from that illustrated in FIGS. 5—8 as hereinbefore suggested. Further, the actuating shaft sections associated with the stopper device may be displaced by means other than an actuating cable as for example by abutment with another stopper device. Further, by placing a stop collar on one of the shaft sections at an appropriate location externally of the core, actuation of the cam member may be limited to one axial direction from the intermediate position. This operational mode may be applicable to the lowering and raising of pipe sections by use of the stopper device as hereinbefore suggested.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. For use in an elongated tubular member, a releasable plug comprising a rigid tubular core enclosing a pressure sealed chamber, expansible sealing means mounted on said core in fluid communication with said chamber, inlet valve means mounted by the core for pressuring the chamber and expanding the sealing means into sealing engagement with the tubular member, mechanical gripping means mounted by the core and biased into engagement with the tubular member for holding the core axially fixed to the tubular member, cam means responsive to displacement within the chamber for disengaging the mechanical gripping means from the tubular member, and control means connected to the cam means for simultaneous displacement of the cam means and venting of the pressurized chamber to release the gripping means and deflate the expansible sealing means.

2. The combination of claim 1 wherein said expansible sealing means comprises a pair of annular sealing tubes disposed on the core axially spaced from each other by the gripping means, and rigid fittings secured to the core anchoring the tubes thereto, said fittings having passages therein establishing fluid communication between the tubes and the chamber.

3. The combination of claim 2 wherein said gripping means comprises a plurality of retainers axially fixed to the core in equal circumferentially spaced relation to each other, a surface engaging element slidably mounted by each of said retainers projecting radially from the core, link means operatively connected to each of the elements within the chamber for engagement by the cam means, and spring means within each retainer urging each of the elements radially outward.

4. The combination of claim 3 wherein said cam means comprises an axial cam member having an intermediate profile portion engaged by the gripping means in an extended position thereof and axial end detent portions engageable by the gripping means to yieldably hold the same in a retracted position.

5. The combination of claim 4 wherein said control means includes an actuating shaft connected to the cam means within the chamber, slide bearing means mounted by the core for slidably mounting the actuating shaft and sealing the chamber, a stop element mounted by the actuating shaft and engageable with the slide bearing means to limit movement of the cam means between at least two operative positions, said shaft having a vent passage formed therein externally venting the chamber when the stop element engages the slide bearing means in one of the operative positions of the cam means.

6. The combination of claim 1 wherein said gripping means comprises a plurality of retainers axially fixed to the core in equal circumferentially spaced relation to each other, a surface engaging element slidably mounted by each of said retainers projecting radially from the core, link means operatively connected to each of the elements within the chamber for engagement by the cam means, and spring means within each retainer urging each of the elements radially outward.

7. The combination of claim 1 wherein said cam means comprises an axial cam member having an intermediate profile portion engaged by the gripping means in an extended position thereof and axial end detent portions engageable by the gripping means to yieldably hold the same in a retracted position.

8. The combination of claim 1 wherein said control means includes an actuating shaft connected to the cam means within the chamber, slide bearing means mounted by the core for slidably mounting the actuating shaft and sealing the the chamber, a stop element mounted by the actuating shaft and engageably with the slide bearing means to limit movement of the cam means between at least two operative positions, said shaft having a vent passage formed therein externally venting the chamber when the stop element engages the slide bearing means in one of the operative positions of the cam means.

9. For use in an elongated tubular member, a releasable plug comprising a rigid tubular core enclosing a pressure sealed chamber, expansible sealing means mounted on said core in fluid communication with said chamber, inlet valve means mounted by the core for pressurizing the chamber and expanding the sealing means into sealing engagement with the tubular member, mechanical gripping means, operating means mounted within the chamber for disengaging said mechanical gripping means and control means connected to the operating means for actuation thereof and to vent the pressurized chamber for deflating the sealing means.

10. For use in an elongated tubular member, a releasable plug comprising a rigid tubular core enclosing a pressure-sealed chamber, expansible sealing means mounted on said core in fluid communication with said chamber, inlet valve means mounted by the core for pressurizing the chamber and expanding the sealing means into sealing engagement with the tubular member, mechanical gripping means, operating means mounted within the chamber for disengaging said mechanical gripping means and control means connected to the operating means for actuation thereof and to vent the pressurized chamber for deflating the sealing means, said control means including an actuating shaft connected to the operating means within the chamber, slide bearing means mounted by the core for slidably mounting the actuating shaft and sealing the chamber, a stop element mounted by the actuating shaft and engageable with the slide bearing means to limit movement of the operating means between at least two operative positions, said shaft having a vent passage formed therein externally venting the chamber when the stop element engages the slide bearing means in one of the operative positions of the operating means.

11. For use in an elongated tubular member, a releasable plug comprising a core, expansible sealing means mounted on the core for engagement with the tubular member when pressurized, mechanical gripping means mounted on the core for anchoring the same to said tubular member, and displaceable means movably mounted by the core for simultaneously deflating the sealing means and retracting the gripping means from engagement with the tubular member.